April 8, 1969     W. J. HUSTON, SR., ET AL     3,436,824
MAGNETIC BASE SABER SAW
Filed Dec. 19, 1966

INVENTORS
William J. Huston, Sr.
& Howard B. McConnell

Dale A. Winnie
ATTORNEY

United States Patent Office 3,436,824
Patented Apr. 8, 1969

3,436,824
MAGNETIC BASE SABER SAW
William J. Huston, Sr., 645 Northfield, and Howard B. McConnell, 465 Brooks St., both of Pontiac, Mich. 48055
Filed Dec. 19, 1966, Ser. No. 602,772
Int. Cl. B27b 11/00
U.S. Cl. 30—273                         6 Claims This invention relates to cutting tools, in general, and more particularly to portable saber type saws and means for assuring their cutting stability.

The saber type saw is a very useful tool for cutting irregular shapes but is quite difficult to use with any degree of accuracy for straight line and detail work. This is principally because the saber saw blade is relatively narrow and travels at such a high rate of speed that it does not have sufficient contact with the work to assure straight line stability.

Since the nature of the saber saw is to provide the ability to cut irregular shapes little thought or consideration has been given to means of assuring greater accuracy for the saw other than through the careful attention and skill of the workman using the tool.

This invention is directed to means for holding a saber saw in closer engagement with a work product to assure greater accuracy for the saw while still preserving its ability to serve its intended purpose.

To be more specific, it is an object of this invention to teach the use of magnetic means for holding the base of a saber saw in more secure engagement with a work product, while still enabling its free movement with minimal effort to cut in any manner desired.

This invention is particularly directed to metal working saber saws and the adaptation of wood working saber saws, with suitable cutting speed, for metal working purposes.

There are several ways that magnetic means may be used to accomplish the desired purpose. Several of these will be discussed in the following specification and reference will be made to the accompanying drawing. The numerous objects and advantages to be gained in the practice of this invention will also be better understood in reading the discussion which follows.

Figure 1:
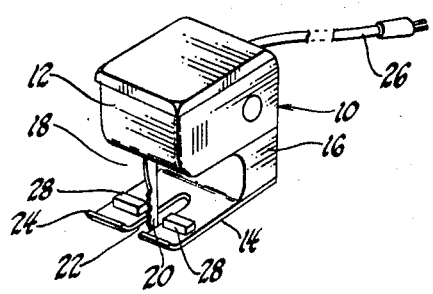
FIGURE 1 is a perspective view of a saber saw adapted to include the features of this invention.
Figure 2:
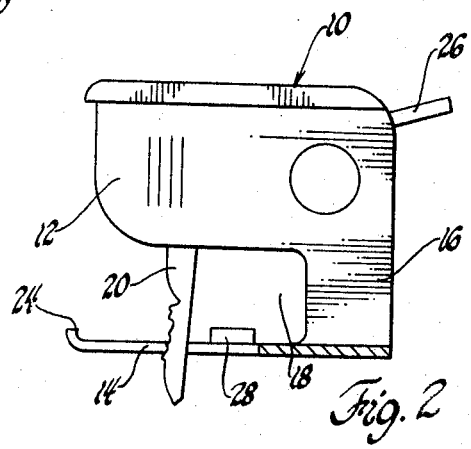
FIGURE 2 is an enlarged side elevational view of the saber saw of the first drawing figure with the base of the saw shown in cross-section.
Figure 3:
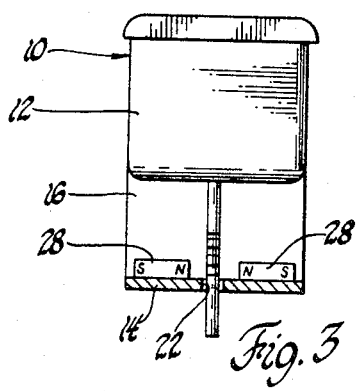
FIGURE 3 is a front elevational view of the saber saw with the base again shown in cross-section to better show the magnetic means used.

A small portable hand-type saber saw 10 is shown in the first three and last drawing figures. It includes the drive motor housing 12 cantilevered over a base platen 14 and supported near the back on the housing trunk support 16. This provides the open space 18 across which the saber saw blade 20 extends.

The base platen 14 includes a slot 22 extending from the front edge back towards the trunk support 16 and through which the saw blade 20 protrudes. The front edge of the base platen is turned up, as at 24, to provide a sled-runner type front edge as is commonly known.

An electrical lead 26 is shown as the means of connecting the motor (not shown) in the housing 12 to a power supply source.

It will be appreciated that the saber saw blade 20 is reciprocated up and down at a high rate of speed, when in use, and that the whole saber saw structure is moved forward to advance the blade for cutting purposes.

In the first three drawing figures, a pair of permanent magnets 28 are shown as disposed on the top surface of the base platen 14 and on each side of the blade slot 22 just behind the saw blade 20 which extends through the slot.

Since it is customary to use aluminum or other light weight materials for the housing 12 and platen 14, the magnets are best secured by some type of adhesive, unless more permanent means of accommodating the magnets is provided, as later discussed.

The magnets 28 are shown disposed transversely on opposite sides of the slot 22 in the base platen 14 and with like magnetic poles forcing each other. The advantage of this arrangement is in setting up magnetic fields in opposition to avoid the collection of metal saw dust and work chips in the course of metal working use of the saber saw. However, the magnets are set back from the saw blade 20 sufficiently to avoid any concern in this regard.

Figure 4:
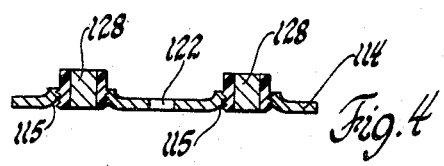
FIGURES 4 and 5 are cross-sections of other saber saw bases adapted in accord with the teachings of this invention.

FIGURE 4 shows an arrangement wherein the base platen 114 is provided with two holes 115 on opposite sides of the blade slot 122, where the magnetic means are to be disposed. The edges of the holes are turned up and threaded to receive small magnets 128 incased in plastic and which will cut their own threads when engaged in the threaded holes.

Figure 5:
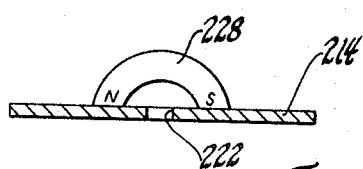
Figure 6:
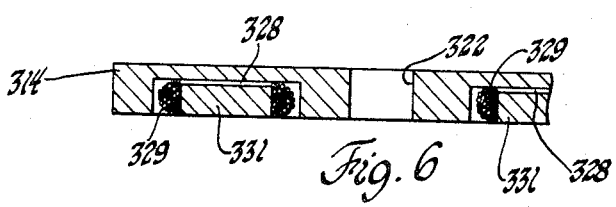
FIGURE 6 is an enlarged cross-section of a brace with built-in electro-magnetic means.
Figure 7:
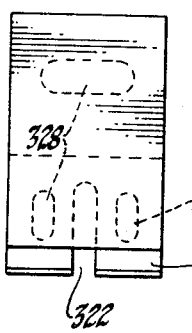
FIGURE 7 is a top plan view of a saber saw including electro-magnetic means in the manner of the last-mentioned drawing figure.

FIGURE 5 shows a simple horseshoe magnet 228 which straddles the blade slot 222, behind the saw blade (not shown) and has its opposite ends engaged to the base platen 214 on opposite sides of the blade slot. In FIGURES 6 and 7 the base platen 314 is shown to be somewhat thicker than usual and to include three electromagnetic elements 328 embedded therein. Each includes a coil 329 about a core member 331 and they are suitably inter-connected, or separate, and are connected to the power source provided the drive motor for the saw to serve their intended purpose. Two of the electromagnetic elements are in the base platen on opposite sides of the blade slot 322 and the other is under the trunk support for the motor housing near the back of the base.

The magnetic means used, in each instance, is to be sufficient to provide magnetic attraction and holding power for the base platen of the saber saw to any ferrous metal with which the saw is used. Only a nominal attraction is required to prevent chatter of the base platen in cutting metals and the more attraction the more advantages to be realized.

For example, a larger attraction force will hold the platen more securely to the metal being worked while still enabling the saw to be moved relatively freely on the work material for closer cutting tolerances. A noticeable, but not too appreciable, force will progress the saw for cutting the work metal but any momentary relief in the motivating force, or otherwise, will not affect the cutting, since the attraction force will hold the saw in its last position.

With the embodiment of FIGURES 6-7, the portable saber saw may be converted into a table saw by disposing the saw on a support, preferably with retaining sides that the base of the saber saw fits into, and applying sufficient current to the electromagnetic means, by the use of transformers or such, to retain the saw in a fixed position for movement of the work relative to it.

Without further discussion, it will be appreciated that there are other variations and improvements within the teachings of this invention by which other objects and ad-

We claim:

1. The improvement in saber saws including a base platen for supporting the saw and having a blade slot provided therein and extending from one end thereof, and comprising:
   a saw blade reciprocated through said blade slot;
   magnetic means received and secured to the base platen for magnetic attraction thereof to metal to be worked by said saw and retaining said saw against chatter and unrestrained movement as a consequence thereof said magnetic means being provided on opposite sides of the blade slot and relatively behind the position of the saw blade received therethrough.

2. The improvement in saber saws of claim 1:
   said magnetic means including a horseshoe magnet straddling the blade slot and disposed in a position behind the saw blade received therethrough.

3. The improvement in saber saws of claim 1:
   said magnetic means including separate permanent magnets disposed with like poles opposite each other on opposite sides of the blade slot.

4. The improvement in saber saws of claim 1:
   suitable openings provided in the base platen on opposite sides of the blade slot and adapted to receive said magnetic means in replaceable engagement therewithin.

5. The improvement in saber saws of claim 1, including:
   a base platen having sufficient depth to accommodate said magnetic means substantially therewithin; and
   said magnetic means including electromagnets operatively connected to serve their intended purpose with the power source provided for said saw.

6. The improvement in saber saws of claim 5, including:
   an electromagnet disposed within the base of said saw and in balanced relation between and relatively behind those on opposite sides of said blade slot.

References Cited

UNITED STATES PATENTS

| | | | |
|---|---|---|---|
| 3,166,985 | 1/1965 | Stanley | 90—12 |
| 1,115,348 | 10/1914 | Taylor | 90—12 |
| 2,596,322 | 5/1952 | Zumwalt | 7—1 |

DONALD R. SCHRAN, *Primary Examiner.*

U.S. Cl. X.R.

90—12; 143—68